(12) United States Patent
Bang

(10) Patent No.: US 6,676,846 B2
(45) Date of Patent: Jan. 13, 2004

(54) DEVICE AND METHOD FOR FABRICATING DIFFRACTIVE GRATINGS

(75) Inventor: Dong-Soo Bang, Seoul (KR)

(73) Assignee: Samsung Electronics Co., LTD, Suwon (KR)

(*) Notice: Subject to any disclaimer, the term of this patent is extended or adjusted under 35 U.S.C. 154(b) by 0 days.

(21) Appl. No.: 10/339,386

(22) Filed: Jan. 9, 2003

(65) Prior Publication Data

US 2003/0136758 A1 Jul. 24, 2003

Related U.S. Application Data

(62) Division of application No. 09/827,874, filed on Apr. 6, 2001, now Pat. No. 6,547,919.

(30) Foreign Application Priority Data

Jun. 29, 2000 (KR) .......................................... 2000-36372

(51) Int. Cl.⁷ ........................ H01L 21/00; G01N 27/26; G03B 27/42
(52) U.S. Cl. .......................................... 216/92; 438/745
(58) Field of Search ................................ 438/745, 746, 438/747; 216/85, 90, 91, 94, 92

(56) References Cited

U.S. PATENT DOCUMENTS

| | | | | |
|---|---|---|---|---|
| 4,518,456 A | * | 5/1985 | Bjorkholm | 438/8 |
| 5,148,214 A | * | 9/1992 | Ohta et al. | 355/43 |
| 5,717,485 A | * | 2/1998 | Ito et al. | 356/237.1 |
| 5,891,757 A | * | 4/1999 | Ohno | 438/149 |
| 6,193,900 B1 | * | 2/2001 | Baek et al. | 216/85 |
| 6,264,825 B1 | * | 7/2001 | Blackburn et al. | 205/777.5 |
| 6,547,919 B2 | * | 4/2003 | Bang | 156/345.11 |

* cited by examiner

Primary Examiner—Gregory Mills
Assistant Examiner—Sylvia R. MacArthur
(74) Attorney, Agent, or Firm—Cha & Reiter

(57) ABSTRACT

There is provided a grating fabrication device and method to form gratings on a semiconductor substrate. The substrate is loaded into a reactor filled with an etchant solution, and an array of parallel light of interference light with different periods is projected onto the substrate to etch the portion of the substrate that is exposed to the light via an oxidation-reduction reaction. At the same time, the inclination angle of the substrate is selectively varied to obtain the different grating periods.

6 Claims, 3 Drawing Sheets

FIG. 1 [PRIOR ART]

DEVICE AND METHOD FOR FABRICATING DIFFRACTIVE GRATINGS

This application is a Divisional Application of U.S. Ser. No. 09/827,874, filed Apr. 6, 2001 now U.S. Pat. No. 6,547,919.

CLAIM OF PRIORITY

This application claims priority to an application entitled, "Device and Method for Fabricating Diffractive Gratings," filed in the Korean Industrial Property Office on Jun. 29, 2000 and there duly assigned Serial No. 2000-36372.

BACKGROUND OF THE INVENTION

1. Field of the Invention

The present invention relates generally to an apparatus and method for fabricating diffractive gratings, and particularly, to an apparatus and method for fabricating semiconductor material comprising gratings.

2. Description of the Related Art

Optical gratings have a variety of uses including frequency selection, optical feedback-type devices and wavelength dispersion. Easy, rapid, and reliable methods of making gratings of high quality with close spacing and high sensitivity are highly desirable in fabricating LDS.

Generally, diffractive gratings are fabricated using a photolithographic technique ordinarily used. A photoresist layer, which is resistant to the etching action, is first formed on a semiconductor substrate and irradiated by interference pattern light. After developing the photoresist, the semiconductor substrate is etched to a predetermined depth, except for the portion covered with the photoresist layer. Thereafter, the photoresist layer is removed from the substrate after etching.

FIG. 1 illustrates a conventional grating fabrication device 10, which includes a light source 11, a beam splitter 12, and reflective mirrors 13 and 14 for generating an interference pattern on a semiconductor material. The reflective mirrors 13 and 14 are arranged in such a way that the beams split by the beam splitter 12 can be focused on the surface of substrate 15.

The formation of diffractive gratings on a semiconductor substrate 15 using the conventional fabrication device 10 is explained hereinafter.

The surface of semiconductor substrate 15 is first cleaned, then a photoresist layer 16 about 500 Angstroms (Å) thick or higher is formed on the semiconductor substrate 15. Then, the resultant structure is exposed to the light beams for a predetermined time. The interference pattern formed by the illumination of light is made by developing the photoresist. Here, the ratio of light exposed portions and unexposed portions covered with the photoresist layer 16 is about one-to-one. Interference pattern on the substrate is formed by etching with a predetermined solution (e.g., HBr-family etchant solution). Finally, the photoresist layer 16 is removed using a photoresist stropper, so that a pattern is obtained.

The conventional fabrication method, as described in the preceding paragraphs, has some drawbacks in that: (1) the manufacturing process is very complicated; (2) the frequent possibility of the thin photoresist layer 16 falling off the substrate 15 makes it difficult to achieve reproducibility and product yields; (3) the plasma ashing must be controlled by repeatedly measuring the light reflectance of the substrate 15 and continued until the intended light reflectance is achieved to form both the residual photoresist layer portions and the exposed portions at the intended ratio; (4) the measurement errors associated with the light reflectance measuring operation tend to diminish the accuracy; and, (5) the lengthy time (about 7 hours) associated in the fabrication process deteriorates the productivity and impedes the desired mass production.

SUMMARY OF THE INVENTION

It is, therefore, an object of the present invention to provide a device and process for fabricating diffractive gratings in a rapid and simplified way, thus increasing the product outputs as well as the product reproducibility.

To achieve the above object, there is provided a process for fabricating diffractive gratings which includes the steps of: providing a semiconductor substrate in a reactor, exposing an interference light pattern onto the semiconductor substrate; and, supplying a positive ion etchant solution in the reactor to etch the substrate via an oxidation-reduction process.

Preferably, the interference pattern exposurer device includes a light source, a beam splitter for splitting the light emitted from the light source into different paths, and light path changing means for focusing the split light beams at different angles onto the surface of the substrate.

Preferably, the reactor includes a support member for supporting the substrate, and the support member is selectively rotatable with respect to the reactor.

Preferably, interference patterns are formed on the substrate with different periods by changing the inclination of the substrate with respect to the incident light during the light irradiation step.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail as they would obscure the invention in unnecessary detail.

Figure 1:
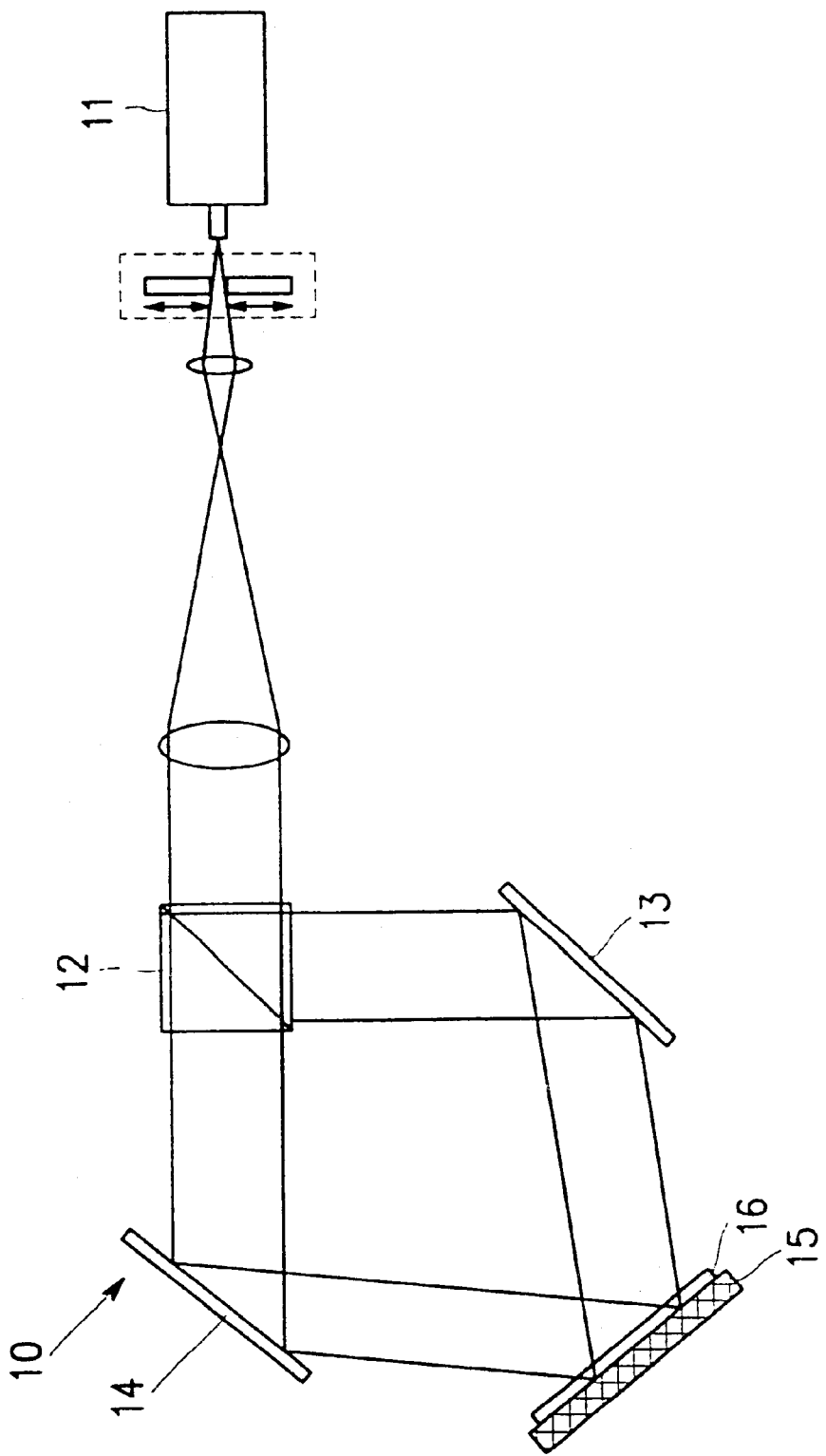
FIG. 1 illustrates a conventional grating fabrication device.
Figure 2:
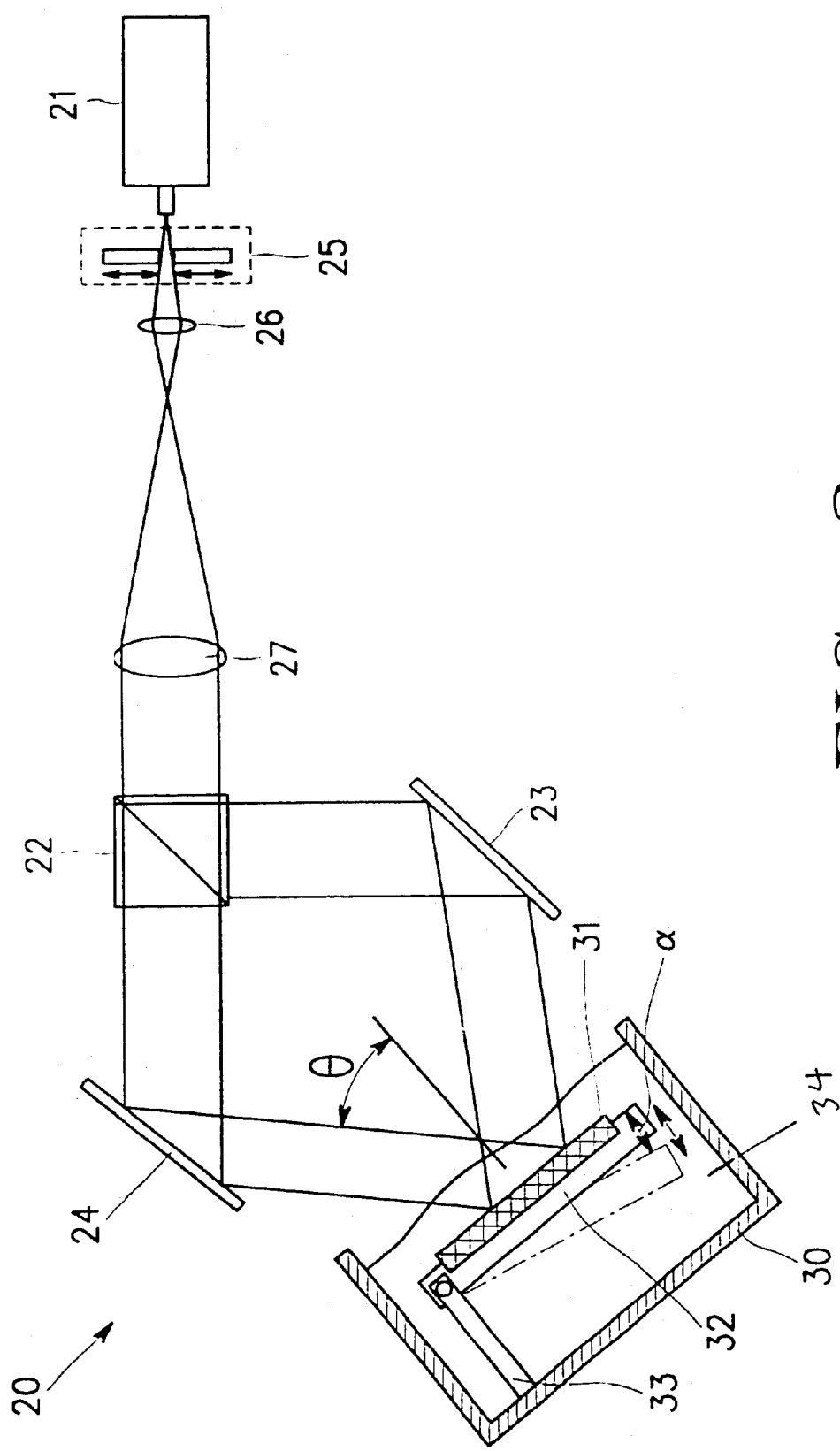
FIG. 2 illustrates a simplified diagram of the grating fabrication device according to the present invention; and, FIG. 3 illustrates energy bands for different types of semiconductor substrates and oxidation-reduction potentials according to the types of the positive ion etchant solutions.

Referring to FIG. 2, in carrying out the invention according to the embodiment of the present invention, there is provided a grating fabricating device comprising an interference pattern exposurer 20, which includes a light source 21, a shutter 25, a first lens 26, a second lens 27, a beam splitter 22, and reflective mirrors 23 and 24, and a reactor 30.

The first lens 26 is a convex lens, which functions as a light enlarger to enlarge or expand the light beam emitted at a predetermined angle from the light source 21. The shutter 25 is provided in front of the light source 21 to transmit/block the beam generated from the light source 21. The second lens 27 is a convex lens positioned away from the first lens 26 by a predetermined distance and functions as a parallel light conversion means by reshaping the light output by the first lens 26 into parallel light beam.

The beam splitter 22 receives the light output from the second lens 27, then splits the received beam into two beams traveling in different paths. These two split beams are reflected by the first reflective mirror 23 and the second reflective mirror 24, respectively, and the respective reflected beams are merged to be focused on at a desired position, as shown in FIG. 2. The first and second reflective mirrors 23 and 24 are used as light path changing means, and configured in such a way that the reflected beams merging from different angles onto the surface of the substrate 31 is focused at a desired location. It should be noted that although one embodiment of light exposing mechanism is described, there are other related devices known to those skilled in this art that can be used for projecting light beams into a reactor.

In the embodiment of the present invention, the reactor 30 includes a support member 33 mounted to the bottom of the reactor 30 at one end, and a holder 32 is rotatably fixed to the support member 33 at the other end. The holder 32 is adaptable to receive a semiconductor substrate 31 to be mounted thereon, and operable to rotate so that the incident angle of the interference light beams being exposed thereto can be varied. As shown in FIG. 2, the period of an interference pattern incident on the substrate 31 is defined by an angle $\theta$ at which the interference pattern light reaches the substrate 31. Therefore, the interference pattern period can be controlled by adjusting the rotation angle $\alpha$ of the holder 32 and the incident angle $\theta$.

The substrate 31 displaced along the holder 32 is disposed in the reactor 30, then etchant solution 34 is poured into the reactor 30 for etching the substrate 31 by an oxidation-reduction reaction. Accordingly, the present invention forms gratings on the substrate 31 in which the grating is made by imaging an array of parallel lines of light (formed by varying the rotation angle $\alpha$ of the holder 32) on the surface and then etched via an oxidation-reduction reaction. Here, the presence of light is realized from the deflected light beams from the mirrors 23 and 24 to induce etching. The etchant solution 34 is in an electroless positive ion state and reduced by receiving electrons from electron-hole pairs that are generated by the light illuminated on the substrate 31. Here, the superfluous holes oxidize the irradiated portions of the substrate 31.

The principle of photo-etching, as described in the preceding paragraphs, occurs by oxidizing the portions of the semiconductor substrate 31 exposed to light with the band-gap energy of the substrate 31 or higher. The electron-hole pairs are generated on the exposed portions of the substrate 31, and the etchant solution 34 is reduced by receiving the electrons. Then, the substrate portions oxidized by the holes are etched to a predetermined thickness.

Accordingly, selection of the etchant solution 34 is varied according to the band-gap energy of the semiconductor device 31. Preferably, the oxidation-reduction reaction of the etchant solution 34 is within the band-gap energy range of the semiconductor substrate 31, and the oxidation energy distribution of the etchant solution 34 is substantially similar to the conductance band of the semiconductor substrate 31. For example, if the substrate 31 is an InP substrate, the etchant solution may be $Fe(CN)_6^{3-}/Fe(CN)_6^{4-}$ or $H^+/H_2$.

Now, a method of fabricating diffractive gratings utilizing the device shown in FIG. 2 is explained hereinafter.

First, any impurities are removed from the semiconductor substrate 31 by an ordinarily used cleaning process. The substrate 31 is loaded on the holder 32 that is provided in the reactor 30. Etchant solution 34 is poured into the reactor. However, it should be noted that the substrate 31 may be placed in the reactor 30 after the etchant solution 34 is filled, or vice versa.

Thereafter, the substrate 31 is exposed to the interference light pattern having the band-gap energy of the substrate 31 or higher, emitted from the interference pattern exposurer 20 for a predetermined time. The exposure time is controlled by the shutter 25.

The presence of light generated by light source 21 and eventually deflected by the respective mirrors 23 and 24 will induce etching. Here, portions of the substrate 31 exposed to the light, defining the interference pattern, are etched through reaction with the etchant solution 34, whereas the unexposed portions of the substrate 31 do not react with the etchant solution 34. As a result, diffractive gratings are formed on the substrate 31. Meanwhile, diffractive gratings can be formed on the substrate 31 in different periods by changing the incident angle $\theta$ of the interference pattern light projected onto the substrate 31. To achieve this, the rotation angle $\alpha$ of the holder 32 is selectively adjusted to form diffractive gratings with different periods.

Figure 3:
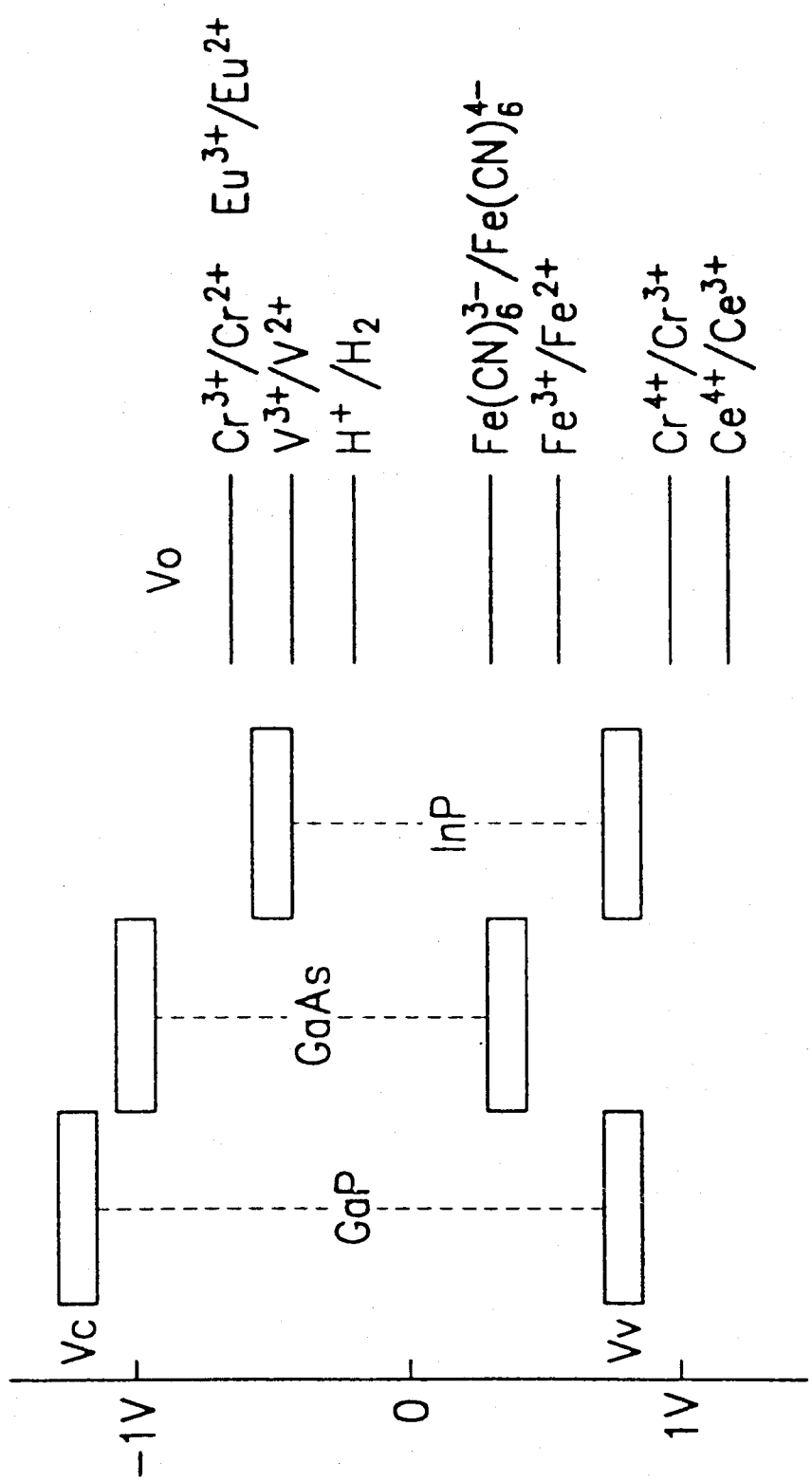

FIG. 3 is a graph showing the energy bands for different types of semiconductor substrates, the oxidation-reduction potentials, and the positive ion solutions.

Referring to FIG. 3, since a $Ce^{4+}/Ce^{3+}$ solution has a high oxidation-reduction potential, it can inject holes into all of GaP, GaAs, and InP. Thus, this etchant solution can etch GaP, GaAs, and InP, regardless of the presence of light irradiation. In the case of an InP substrate, an etchant solution $Fe(CN)_6^{3-}/Fe(CN)_6^{4-}$ may be used to satisfy the photo-etching condition.

Accordingly, the inventive method relying on the above-described photo-etching process can be applied to a variety of semiconductors by appropriately selecting the etchant solution 34 which enables photo-etching to occur on the substrate 31. In particular, the inventive method is very effective to form diffractive gratings on the InP substrate such as a Distributed FeedBack (DFB) semiconductor laser. In an actual simulation of fabrication grating using the inventive process, it took about two hours to fabricate semiconductor materials comprising diffractive gratings.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for fabricating diffractive gratings using a fabrication device, which includes a reactor filled with a predetermined etchant solution and a light generating device for illuminating interference light beams at a predetermined angle to said reactor, the method comprising the steps of:

loading a substrate into said reactor so that said substrate is submerged in said etchant solution;

illuminating said substrate with said interference light beams generated by said light generating device; and, etching the portion of said substrate submerged in said etchant solution that is exposed to said interference light beams generated by said light generating device; and selectively changing the inclination of said substrate to form different gratings having different periods with respect to an incident light angle of said interference light beam.

2. The method of claim 1, wherein said substrate is an InP substrate and said etchant solution is $Fe(CN)_6^{3-}/Fe(CN)_6^{4-}$.

3. A method for fabricating diffractive gratings using a fabrication device, which includes a reactor filled with a predetermined etchant solution and a light generating device for illuminating interference light beams at a predetermined angle to said reactor, the method comprising the steps of:

loading a substrate into said reactor so that said substrate is submerged in said etchant solution;

illuminating said substrate with said interference light beams generated by said light generating device; and, etching the portion of said substrate submerged in said etchant solution that is exposed to said interference light beams generated by said light generating device, wherein said substrate is an InP substrate and said etchant solution is $H^+/H_2$.

4. A method for fabricating gratings, the method comprising the steps of:

loading a substrate into a reactor, said substrate disposed in a horizontal orientation with respect to said reactor;

pouring a predetermined etchant solution into said reactor to submerge said substrate in said etchant solution;

illuminating said substrate with at least one parallel line of an interference light beam generated by a light generating device; and, etching the portion of said substrate submerged in said etchant solution that is simultaneously exposed to the interference pattern light generated by said light generating device; and selectively changing the inclination of said substrate with respect to an incident light angle of said interference light beam.

5. The method of claim 4, wherein said substrate is an InP substrate and said etchant solution is $Fe(CN)_6^{3-}/Fe(CN)_6^{4-}$.

6. A method for fabricating gratings, the method comprising the steps of:

loading a substrate into a reactor, said substrate disposed in a horizontal orientation with respect to said reactor;

pouring a predetermined etchant solution into said reactor to submerge said substrate in said etchant solution;

illuminating said substrate with at least one parallel line of an interference light beam generated by a light generating device; and, etching the portion of said substrate submerged in said etchant solution that is simultaneously exposed to the interference pattern light generated by said light generating device, wherein said substrate is an InP substrate and said etchant solution is $H^+/H_2$.

* * * * *